(12) United States Patent
MacGougan

(10) Patent No.: US 9,360,559 B2
(45) Date of Patent: Jun. 7, 2016

(54) GNSS NAVIGATION SOLUTION USING INEQUALITY CONSTRAINTS

(75) Inventor: Glenn Donald MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 651 days.

(21) Appl. No.: 13/426,426

(22) Filed: Mar. 21, 2012

(65) Prior Publication Data
US 2013/0249733 A1 Sep. 26, 2013

(51) Int. Cl.
*G01S 19/47* (2010.01)
*G01S 19/50* (2010.01)

(52) U.S. Cl.
CPC *G01S 19/47* (2013.01); *G01S 19/50* (2013.01)

(58) Field of Classification Search
CPC .................................. G01S 19/50; G01S 19/47
USPC ..................................................... 342/357.33
See application file for complete search history.

(56) References Cited

U.S. PATENT DOCUMENTS

| | | | |
|---|---|---|---|
| 6,985,903 B2 | 1/2006 | Biacs | |
| 7,504,996 B2 | 3/2009 | Martin | |
| 7,761,179 B2 * | 7/2010 | Patel et al. | 700/103 |
| 8,700,322 B2 * | 4/2014 | Riley et al. | 701/469 |
| 2009/0210156 A1 * | 8/2009 | Riley et al. | 701/300 |
| 2010/0093377 A1 | 4/2010 | Riley et al. | |
| 2010/0299063 A1 | 11/2010 | Nakamura et al. | |
| 2011/0288771 A1 | 11/2011 | Mazlum et al. | |

OTHER PUBLICATIONS

Richard, P W, "Constrained Kalman Filtering Using Pseudo-Measurements," The Institution of Electrical Engineers (IEE), May 16, 1995, presented at Colloquium organized by Professional Groups C8 (Control systems theory and design), E5 (signal processing) and E15 (Radar, sonar and navigation systems) in association with the Royal Aeronautical Society, held at Savoy Place, London UK, 7 pages.

* cited by examiner

*Primary Examiner* — Frank J McGue
(74) *Attorney, Agent, or Firm* — Fish & Richardson P.C.

(57) ABSTRACT

Information such as altitude or speed limits for a specific geographic region can be utilized to improve position and velocity estimation for a mobile device using inequality constraints. The inequality constraints can be used as pseudo-measurements when needed to improve position and velocity estimation.

40 Claims, 8 Drawing Sheets

GNSS NAVIGATION SOLUTION USING INEQUALITY CONSTRAINTS

TECHNICAL FIELD

This disclosure relates generally to Global Navigation Satellite Systems (GNSS), and more particularly to improving GNSS navigation solutions and detecting fault measurements.

BACKGROUND

Modern mobile devices may include a variety of applications that depend on an accurate estimate of device location, such as a map application or location-based services (LBS) application. An integrated Global Positioning System (GPS) receiver and onboard sensors (e.g., accelerometers, gyroscopes) can be used to determine location and orientation of the device, and even provide a rough estimate of heading.

Many GPS receivers use a recursive estimation algorithm (e.g., Kalman Filter) to provide a computationally efficient navigation solution. A linear form of the Kalman Filter, such as the Extended Kalman Filter (EKF), can be used if the system equations or measurement equations are non-linear. The EFK provides a good result if the state vector is chosen carefully. Even if the state vector is carefully chosen, the EFK can generate erratic estimates due to biased GNSS measurements (e.g. multipath signals), poor solution geometry (e.g. urban canyons), and low measurement redundancy (e.g. few satellites available).

SUMMARY

Information such as altitude or speed limits for a specific geographic region can be utilized to improve position and velocity estimation for a mobile device using inequality constraints. The inequality constraints can be used as pseudo-measurements when needed to improve position and velocity estimation.

Various implementations of the subject matter described herein may provide one or more of the following advantages: 1) an improved horizontal and vertical accuracy for GNSS first fix cases, and 2) an improved ability to perform GNSS measurement fault detection.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
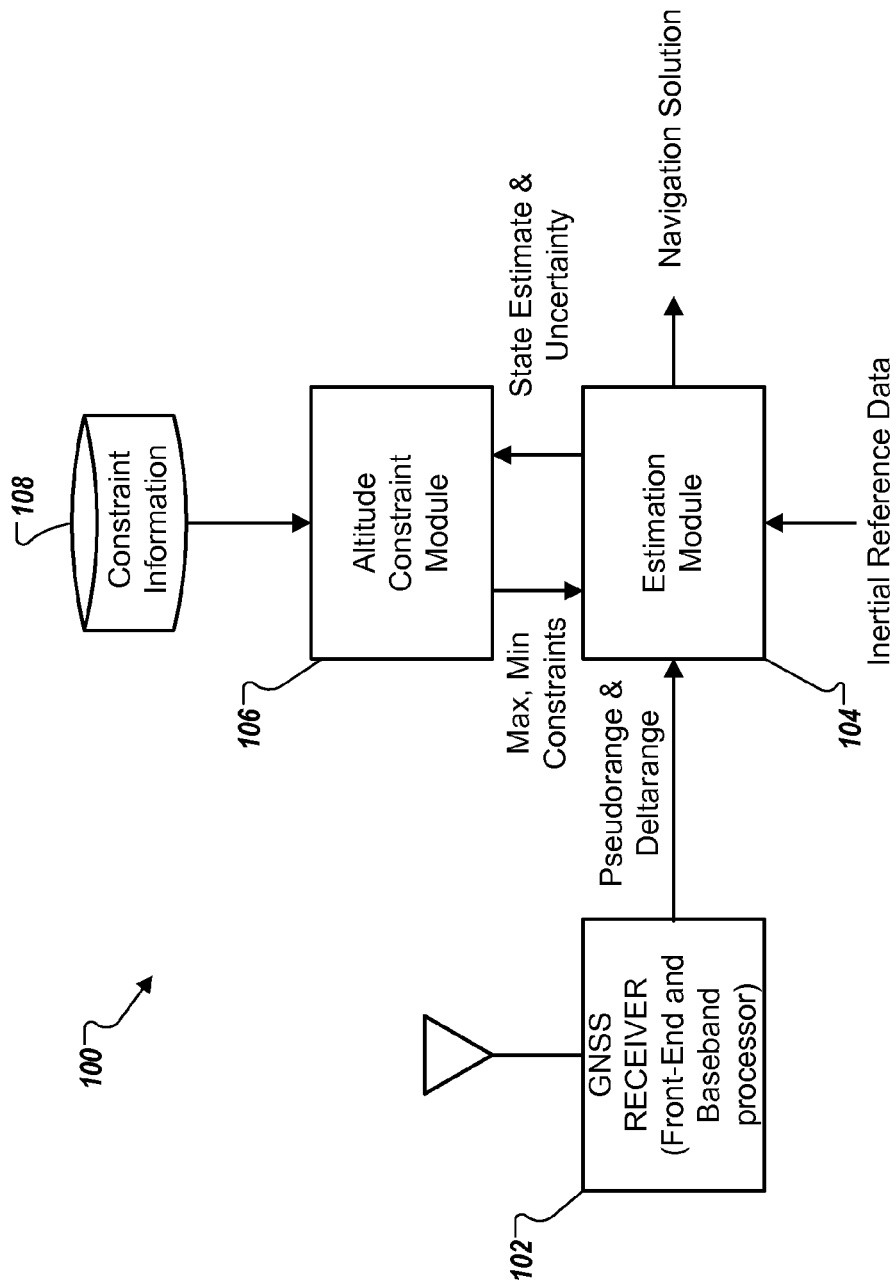
FIG. 1 is a block diagram of an exemplary navigation system using an altitude inequality constraint to improve a navigation solution.

Information for specific location regions of interest can be used to improve GNSS position and/or velocity estimation by providing constraints that limit the values of the estimated states (e.g., position and velocity parameters).

The maximum and minimum ground altitudes (and maximum building heights) for a specific location region may be known. This information can be held in a database as a digital elevation model for the region and the maximum and minimum values can be extracted from the database. The maximum and minimum information can be encoded using a look up table for specific regions. For example, a cell-location based look up table could be used to store maximum and minimum altitudes for the region in which the cell is used. The GPS position estimation can utilize this information as an altitude inequality constraint.

The use of speed or velocity inequality constraints can be also useful for estimation. For cases when the user is driving, the maximum speed value (with some allowance for typical speeders) can be determined from a street map database limited to the likely region including the user position. As an example, given a point estimate of location in downtown San Francisco with an associated uncertainty region (e.g., assuming a 200 m circle), the maximum speed could be assessed based on road map data and an assumption of how much people typically speed (e.g., 50 km/hr speed limit+40 km/hr excess speed=90 km/hr a maximum speed). A maximum speed inequality constraint can then be communicated to the GPS receiver's estimation process. The receiver can enforce this constraint as an inequality constraint on the state estimator in the event that the speed estimate exceeds the maximum value. Further, given knowledge of a map-matched solution, mapping to a specific road, the inequality constraint could become a vectorized constraint (max velocity east, and ma velocity north or max velocity across-track and max velocity along track).

A database of roads is not required for utilizing speed inequality constraints. If the user activity context is known, by analysis of the devices accelerometer samples for example, this information can be used to limit the maximum speed of the GPS solution. If the user context is walking, then it is unlikely that the user is traveling faster than 30 km/hr. If the user context is running, then it is unlikely that the user is traveling faster than 50 km/hr.

Inequality constraints are useful in position and velocity estimation to contain the navigation solution's estimated states within expected boundaries. Often when these boundaries are exceeded, this indicates that something is wrong with the estimation and the problem is usually due to measurement outliers. When inequality constraints are applied, these measurement outliers can be detected and the result is a much more accurate estimation.

Inequality tests can be employed after the regular estimation method is complete. If an estimated state crosses a boundary, the estimation method can be performed again with a pseudo-measurement to force the solution to the expected boundary. For example, if the maximum value is exceeded, a pseudo-measurement at the minimum value can be used. This seems counterintuitive in that the pseudo-measurement is not the boundary value that was exceeded. The boundary value that was exceeded cannot be used because it would necessitate using a small pseudo-measurement variance. This method is considered an optimal method of applying inequality constraints because it adds a minimal amount of information to move the state to the boundary value. Inequality constraints can be employed with estimation methods including recursive least squares and EKF.

Exemplary Navigation System

FIG. 1 is a block diagram of an exemplary navigation system 100 using an altitude inequality constraint to improve a navigation solution. System 100 can be included in a mobile device and used to provide location information to various applications running on the mobile device (e.g., map applications, location-based services). A mobile device is any device that uses GNSS technology to determine location, including but not limited to: portable computers, smart phones, electronic tablets and vehicle navigation systems. In some implementations, navigation system 100 can include GNSS receiver front end 102 (e.g., a GPS receiver), estimation module 104, altitude constraint module 106 and digital elevation data 108. One or more of estimation module 104, altitude constraint module 106 and digital elevation data 108 can be included with GNSS receiver front end 102 in a GNSS receiver apparatus, such as a GPS receiver.

Estimation module 104 can be implemented in software or firmware that is executed by one or more hardware processors or processing cores in the GNSS receiver. Estimation module can also be implemented at least partially in hardware or a combination of hardware and firmware or in application software. In some implementations, estimation module 104 can use pseudo-range and delta-range (Doppler) measurements provided by a GNSS receiver (front end and baseband processor) 102 to determine a navigation solution for a mobile device. Estimation module 104 can implement well-known estimation techniques, including EKF and least-squares estimation, as discussed below in more detail.

Digital elevation data 108 can be stored locally on the mobile device or on a network device. An example of digital elevation data is a Geographic Information System (GIS) that uses position coordinates (or latitude, longitude) as a key index variable for elevation information.

In some implementations, altitude constraint module 106 receives a horizontal position estimate $(\hat{x}, \hat{y})$ and a corresponding statistical uncertainty $(\sigma_x^2, \sigma_y^2)$ associated with the horizontal position estimate. The position estimate and corresponding uncertainty can be taken from one or more previous position estimates computed by estimation module 104. For example, a position estimate can be taken from the current state vector estimate of EKF or least-squares estimator and the position estimate uncertainty can be determined from the current state error covariance associated with the state vector estimates, which will be described in more detail below. Alternatively, the position estimate and corresponding position estimate uncertainty can be provided by an Inertial Navigation System (INS). The INS can obtain measurements from inertial sensors (e.g., accelerometers, gyro sensors, magnetometers) and compute a position estimate and corresponding position estimate uncertainty from the INS data using known techniques.

In some implementations, an average or mean of horizontal position estimates can be used to retrieve digital elevation data 108. The mean and variance of position estimate component $\hat{x}$ can be calculated from a number of past position estimates of $\hat{x}$. For example, for N values of $\hat{x}$, a mean $\mu_x$ and variance $\sigma_x^2$ can be computed by $$\mu_x = \frac{1}{N} \sum_{i=1}^{N} \hat{x}_i, \quad [1]$$

$$\sigma_x^2 = \frac{1}{N} \sum_{i=1}^{N} (\hat{x}_i - \mu_x)^2. \quad [2]$$

A similar calculation can be made for the y coordinate. The position coordinates can be provided by estimation module 104 or the INS in a reference coordinate frame that is compatible with accessing digital elevation 108 from a database. Alternatively, the position coordinates can be transformed into any desired reference coordinate frame using an appropriate transformation matrix and known coordinate transformation techniques (e.g., cosine matrices, quaternions).

Altitude constraint module 106 uses the estimated position to index a database of digital elevation data 108 to find an elevation corresponding to the estimated position, as described in reference to FIG. 2 below.

Determining Altitude Boundaries

Figure 2:
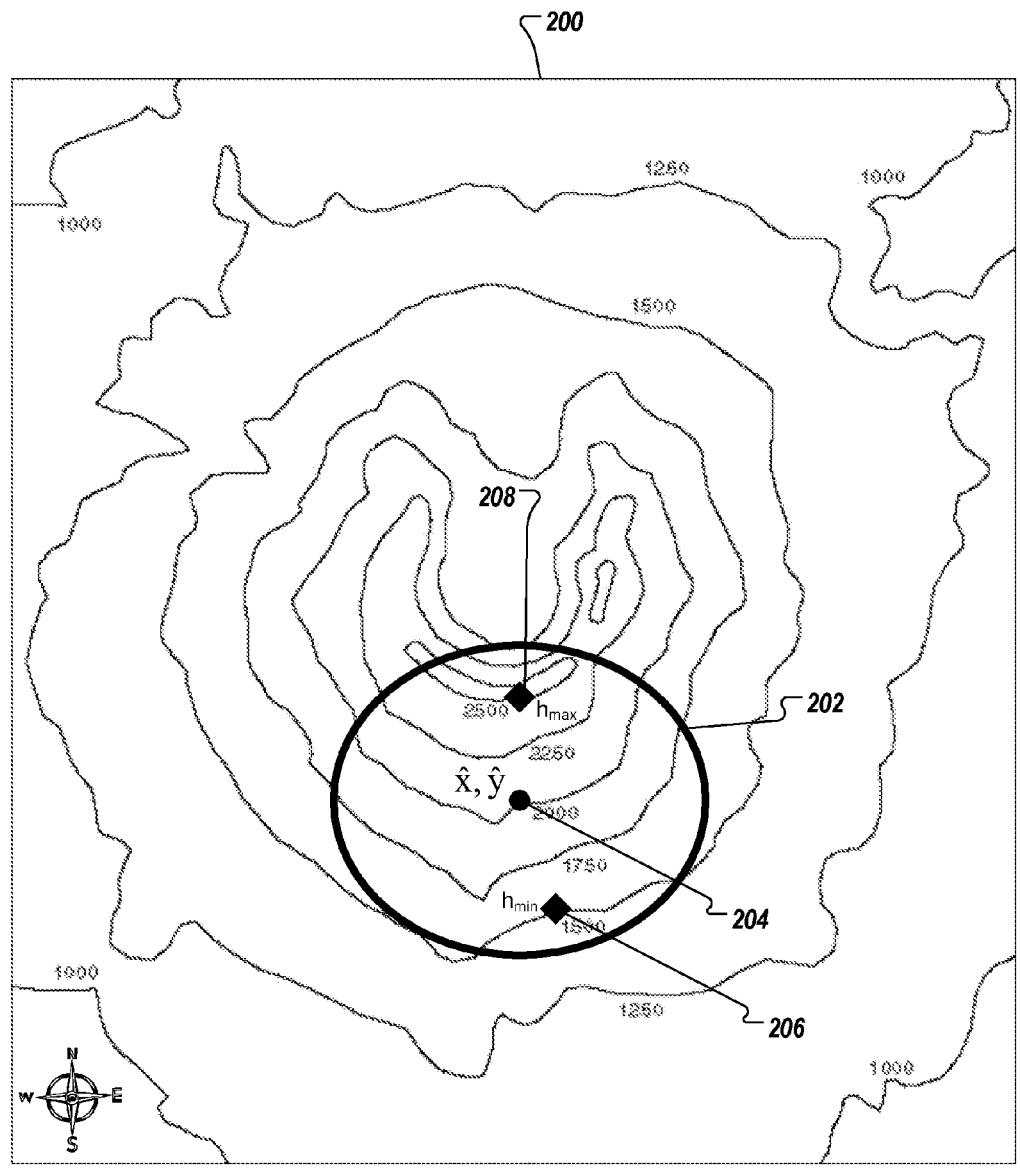
FIG. 2 is two-dimensional contour plot illustrating the determination of an altitude inequality constraint.

FIG. 2 is a two-dimensional contour plot 200 illustrating the determination of altitude inequality constraints. Contour plot 200 is a visual representation of map elevation data 108. In the example shown, the position estimate 204 received from estimation module 104 is marked on contour plot 200 as a solid circle. An uncertainty region 202 surrounds position estimate 204 and the true position of the mobile device lies somewhere within uncertainty region 202. Uncertainty region 202 can be determined by the horizontal components (e.g., East $(\hat{x})$ and North $(\hat{y})$ components) of the statistical uncertainty of position estimate 204. For example, the variances $(\sigma_x^2, \sigma_y^2)$ can be taken from the state error covariance matrix P and used by estimation module 104 to define uncertainty region 202. In some implementations, these variances are provided by an INS system or other assisted GPS device or process.

Within uncertainty region 202, there are points of minimum elevation 206 and a maximum elevation 208, each of which is marked as a solid diamond. Thus, given position estimate 204 and uncertainty region 202, altitude constraint module 106 determines the minimum and maximum altitudes $h_{min}$, $h_{max}$ within uncertainty region 202. The determined minimum and maximum altitudes in uncertainty region 202 are used in an altitude inequality constraint to improve the navigation solution and/or for integrity monitoring of GNSS or INS measurements.

In the example shown, position estimate 204 is lying on the contour line for elevation of 2000 feet. The highest elevation in uncertainty region 202 is lying on the contour line (or within the region surrounded by the contour line) for elevation 2500 feet. The lowest elevation in uncertainty region 202 is lying on the contour line (or within the region surrounded by the contour line) for 1250 feet. Thus, in this example $h_{min}$ is between about 1250 and about 1500 feet and $h_{max}$ is about 2500 feet. In some implementations, digital elevation data 108 can be accessed from a database table of elevations that can be indexed by latitude and longitude. Interpolation techniques can be used to determine elevations that fall between table values. Portions of digital elevation data 108 can be downloaded periodically to the mobile device based on the current estimated location of the mobile device. The portions of digital elevation data can be stored in local cache of the mobile device.

The minimum and maximum altitudes $h_{min}$, $h_{max}$ determined by altitude constraint module 106 can be used as an altitude (height) inequality constraint in an EKF formulation, as described below in reference to FIGS. 3A-3C.

For discussion purposes, we assume the mobile device navigation state vector is given by $$\vec{x} = [x, y, z, \dot{x}, \dot{y}, \dot{z}],  \quad [3]$$

where x, y and z, and $\dot{x}$, $\dot{y}$, $\dot{z}$, are the position and speed components of the mobile device in ENU Cartesian coordinates, respectively.

Letting $h_{min}$, $h_{max}$ represent the minimum and maximum altitudes in the uncertainty region 202 shown in FIG. 2, an altitude inequality constraint can be defined by $$h_{min} \leq \vec{h}\,\vec{x} \leq h_{max}, \quad [4]$$

where $\vec{h} = [0\ 0\ 1\ 0\ 0\ 0]$ is a measurement function. Note that matrices will hereafter be represented by bold capital letters.

The state vector $\vec{x}$ and corresponding state error covariance P can be updated using well-known EKF formulations that include a prediction phase and a updating phase as follows:

A. Prediction $$\vec{x}_k^- = \Phi \vec{x}_{k-1}^+ \quad [5]$$

$$P_k^- = \Phi P_{k-1}^+ \Phi^T + Q \quad [6]$$

B. Updating $$K_k = P_k^- H_k^T (H_k P_k^- H_k^T + R)^{-1} \quad [7]$$

$$\vec{x}_k^+ = \vec{x}_k^- + K_k(\vec{y} - H(\vec{x}_k^-)) \quad [8]$$

$$P_k^+ = (I - K_k H_k) P_k^-, \quad [9]$$

where, $\Phi$ is a state transition matrix, Q is the system noise error covariance matrix, P is the state vector error covariance matrix, H is the Jacobian of the measurement function evaluated at the predicted state, K is the gain matrix, $\vec{y}$ is the actual measurement vector and R is the measurement noise error covariance matrix. The superscript "−" is the state before the measurement update and the superscript "+" is the state after measurement update.

The matrices described above are known in EKF formulations, and the derivation of elements of these matrices is based on the particular application that is employing the EKF formulations. Of particular interest is the computation of the z-component of the measurement noise model represented by the measurement noise, error covariance matrix R, which can be computed using the altitude inequality constraint of equation [4].

Applying Inequality Constraints Using EKF

The general method of applying inequality constraints to the EKF is well known. This method described below adds a minimal amount of information to the EKF to achieve the constraint and is thus optimal (it does not over-constrain the solution). The general method of applying inequality constraints using an EKF can be revised to improve the ability of the EKF to detect and remove measurement failures and thus improve the solution accuracy as well as bound the state to the inequality region. It is preferred to use a sequential method of updating the EKF, as described in equations [5]-[9] above.

Figure 3A:
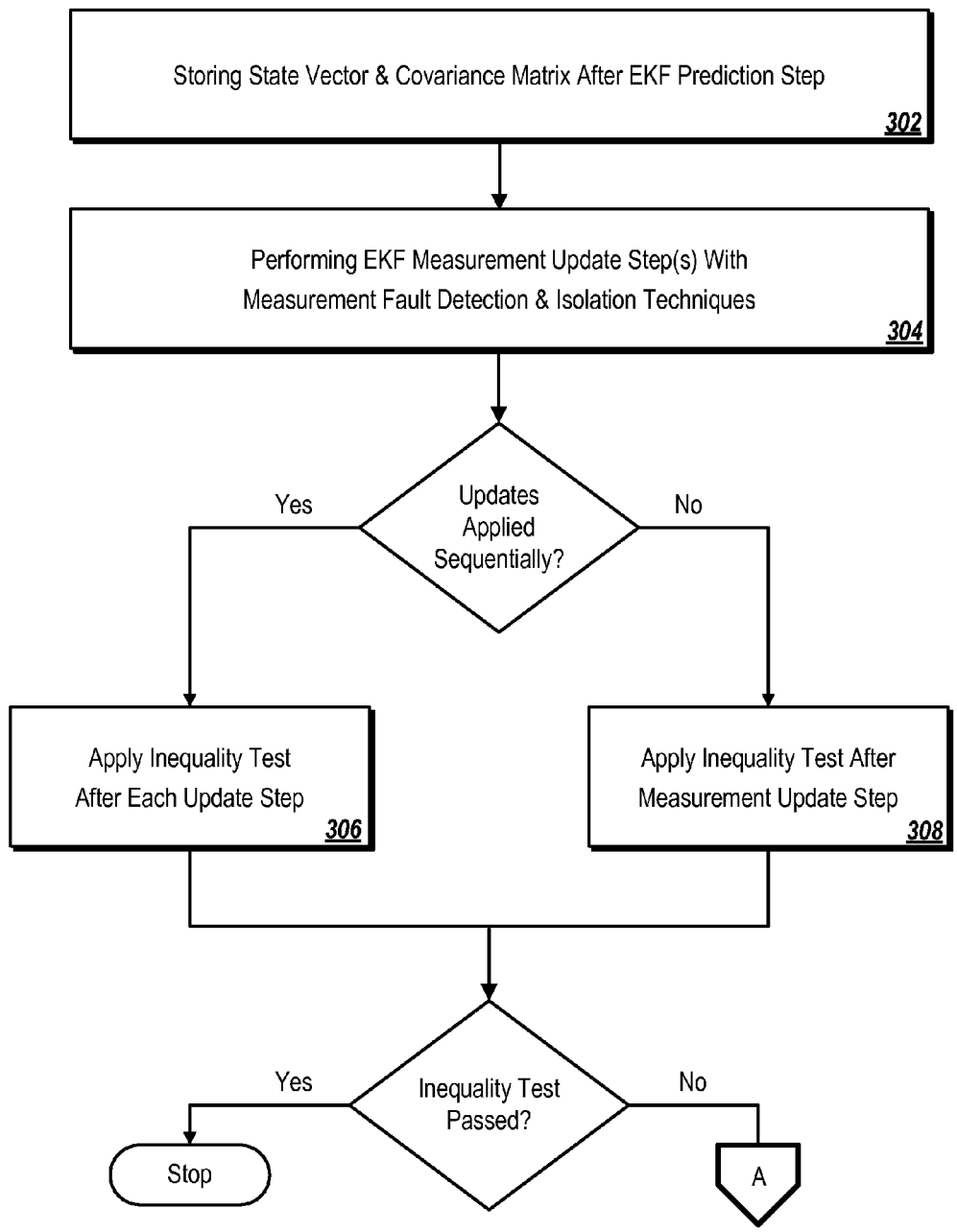
FIGS. 3A-3C is a flow diagram of an exemplary process for applying inequality constraints using EKF.
Figure 3B:
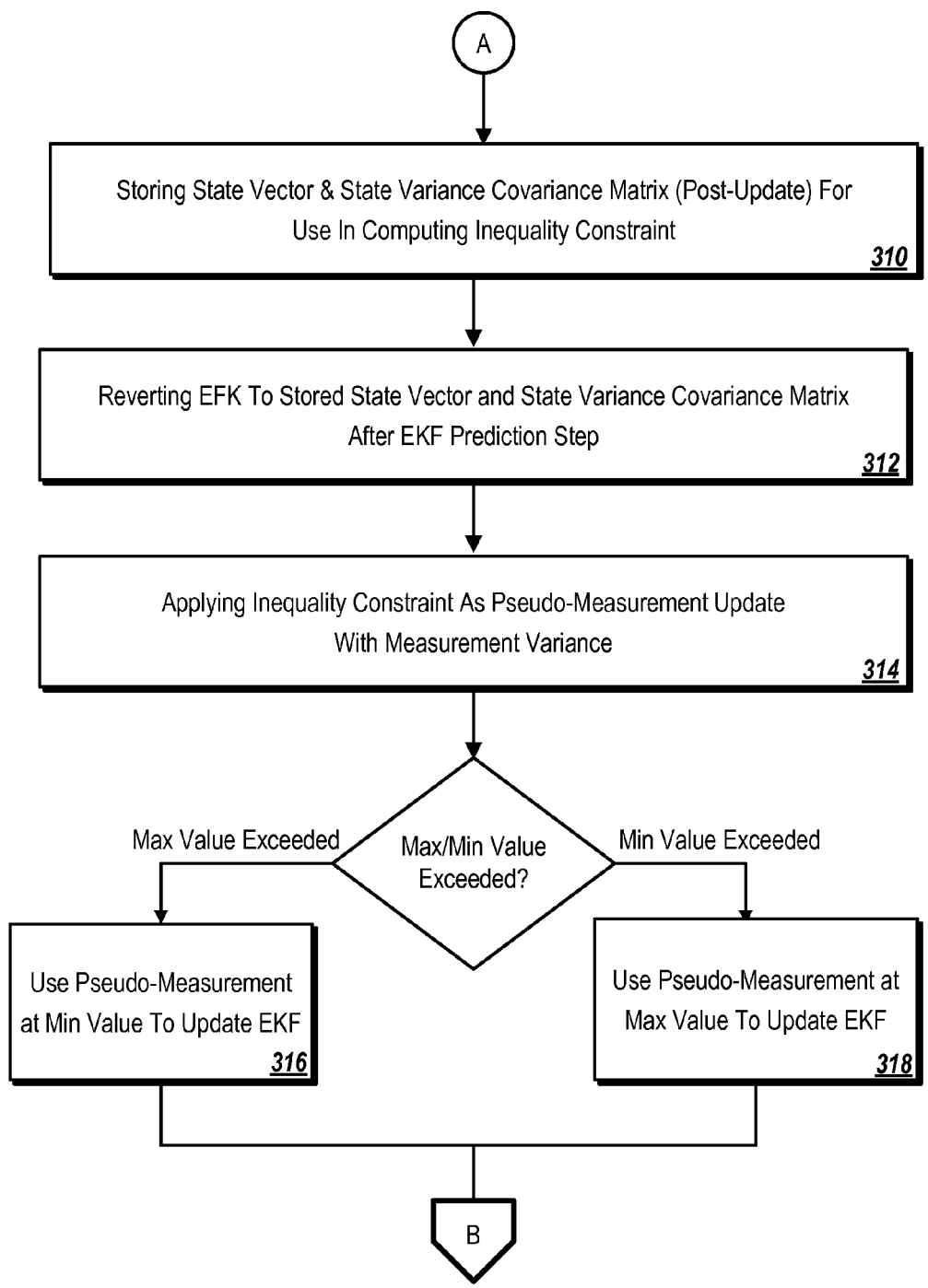
Figure 3C:
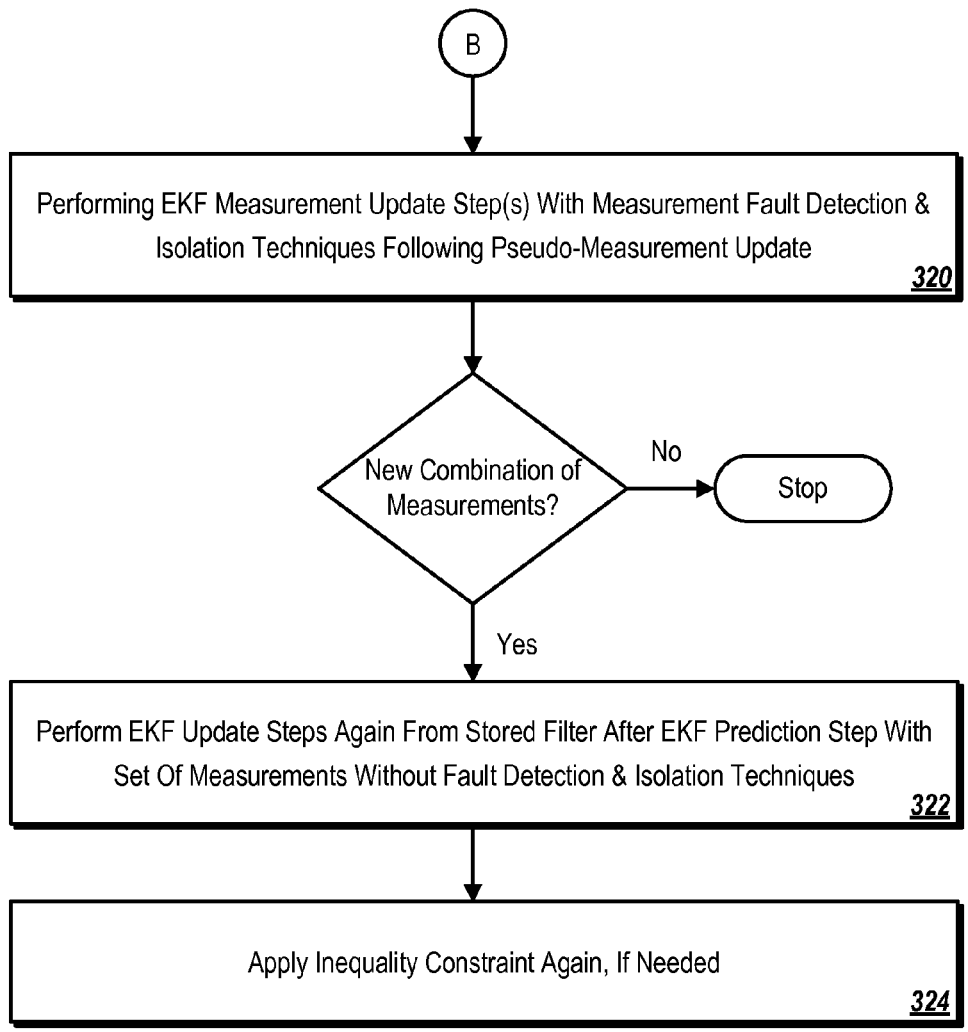

FIGS. 3A-3C is a flow diagram of an exemplary process 300 for applying inequality constraints using the EKF. Process 300 can be implemented by system 100 shown in FIG. 1.

In some implementations, process 300 can begin by storing the state vector and state covariance matrix after the EKF prediction step (302), as described by equations [5] and [6]. Process 300 can continue by performing the EKF measurement update step(s) with appropriate measurement fault detection and isolation techniques (304), as described by equations [6]-[9]. If the measurement updates are applied sequentially, then the inequality test is applied after each update (306). Otherwise, the inequality test is applied after the measurement update step (308). If the inequality test passes, then the solution is final and process 300 ends. If the inequality test fails for any update, the EKF state vector and covariance matrix (post-update) are stored for use in computing the inequality constraint (310). The EKF then reverts to the stored state vector and state variance covariance matrix after the EKF prediction step (312).

The inequality constraint is then applied as a pseudo-measurement update with an appropriate measurement variance (314). If the maximum value was exceeded, a pseudo-measurement at the minimum value can be used to update the EKF (316). The measurement innovation, $\upsilon_\beta$, and the measurement variance for this pseudo-measurement $\sigma_\beta^2$, can be given by:

$$\upsilon_\beta = \beta_{min} - \hat{\beta}^- \quad [10]$$

$$\sigma_\beta^2 = P_{k_{\beta\alpha}}^+ \frac{\beta_{max} - \beta_{min}}{\hat{\beta}^+ - \beta_{max}},$$

where $\hat{\beta}^-$ is the value of the state after the EFK prediction step, $\hat{\beta}^+$ is the value of the state after the update step (which exceeds the maximum bias value), $\beta_{min}$ is the minimum value and also the value of the pseudo-measurement, $P_{k_{\beta\alpha}}^+$ is the element of the state covariance matrix after the update step corresponding to the state which has exceeded the maximum, and $\beta_{max}$ is the value of the pseudo-measurement.

If the minimum value was exceeded, a pseudo-measurement at the maximum value can be used to update the EKF (318). The measurement innovation, $\upsilon_\beta$, and the measurement variance for this pseudo-measurement, $\sigma_\beta^2$, can be given by:

$$\upsilon_\beta = \beta_{max} - \hat{\beta}^- \quad [11]$$

$$\sigma_\beta^2 = P_{k_{\beta\alpha}}^+ \frac{\beta_{max} - \beta_{min}}{\beta_{min} - \hat{\beta}^+},$$

where $\beta_{max}$ is the value of the pseudo-measurement.

Process 300 can continue by performing the EKF measurement update step(s) with appropriate measurement fault detection and isolation techniques following the pseudo-measurement update (320). If a new combination of measurements results from the use of the pseudo-measurement constraint, the update steps can be performed again (from the stored filter after the EKF prediction step) with the set of measurements without fault detection and without the pseudo-measurement constraint to avoid over-constraining the solution (322). The inequality constraint can then be applied again if needed (324).

The impact of the pseudo-measurement when there is no change in the measurements used is that the state is moved to the expected maximum or minimum point. If different measurements are detected as measurement faults, then the state can be different from the boundary value. In many cases, the solution can be improved by the rejection of an outlier measurement, which improves the accuracy of the solution. However, it should be noted that the solution with the revised set of included measurements is potentially over-constrained unless the final iterative step is taken.

Applying Inequality Constraints Using Least-Squares Estimation

Figure 4A:
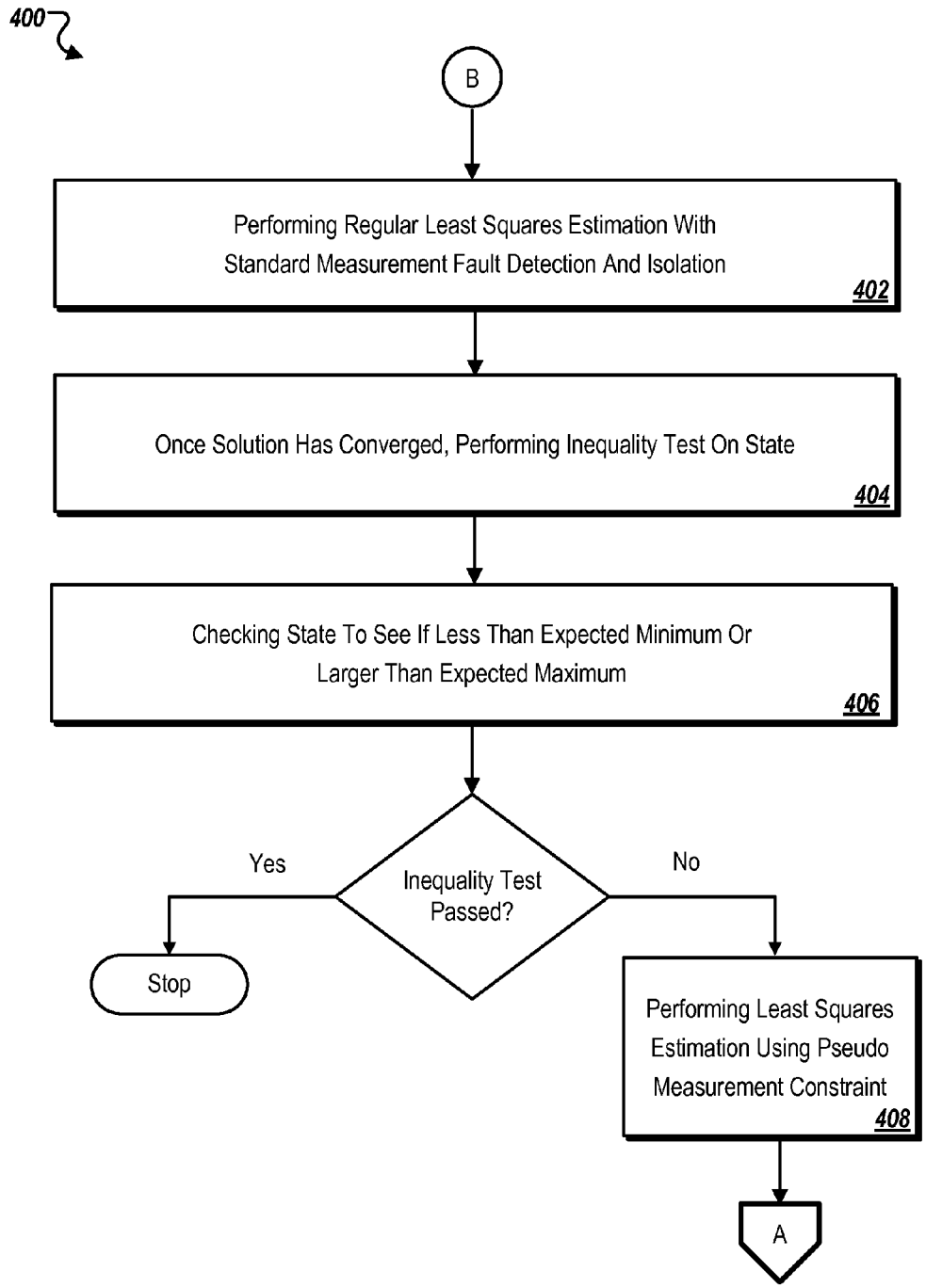
FIGS. 4A-4B is a flow diagram of an exemplary process for applying inequality constraints using least-squares estimation.
Figure 4B:
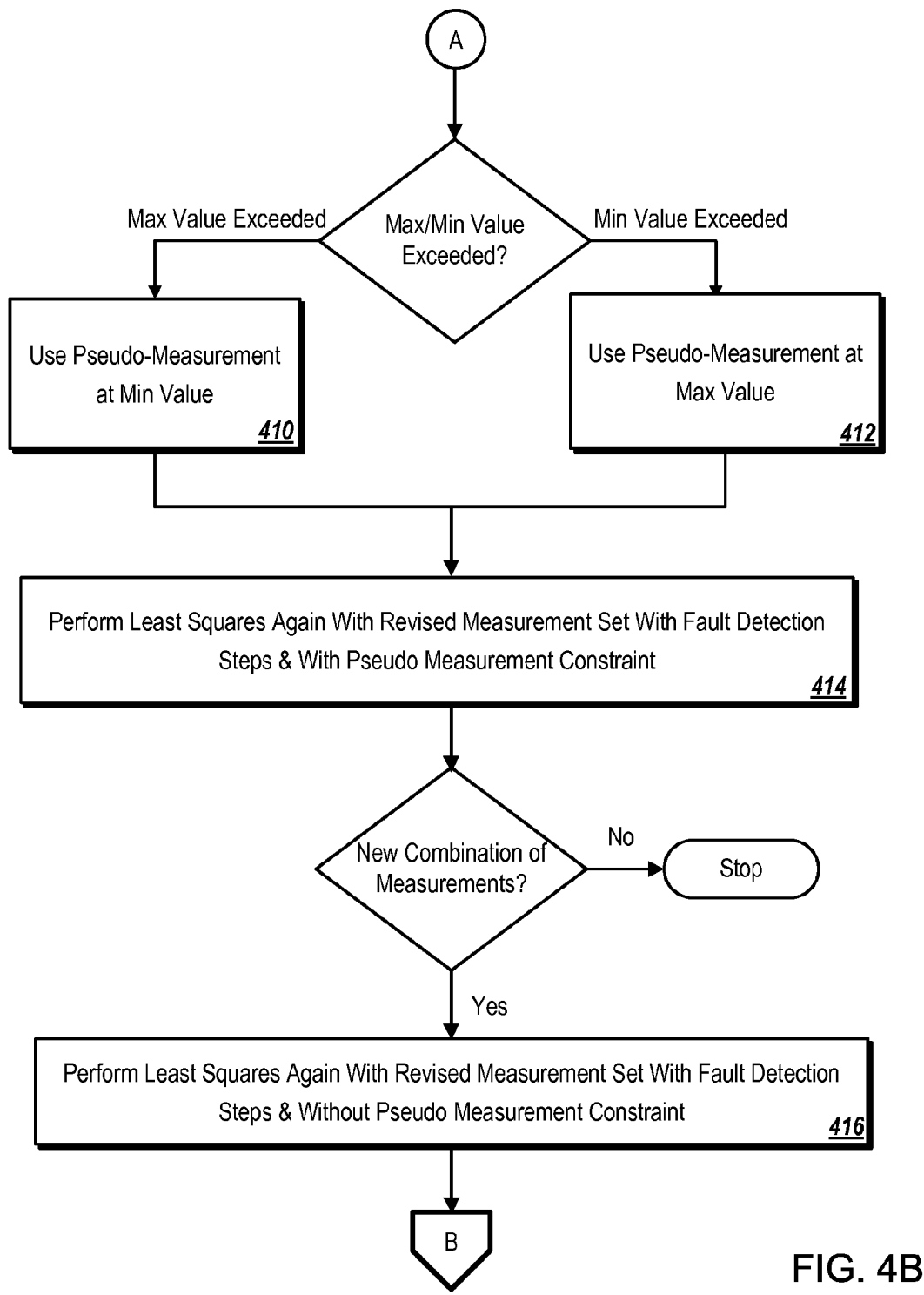

FIGS. 4A-4C is a flow diagram of an exemplary process 400 for applying inequality constraints using least-squares estimation. Process 400 can be implemented by system 100 shown in FIG. 1.

In some implementations, process 400 can begin by performing regular least squares estimation with standard measurement fault detection and isolation (402). Once the solution has converged, the inequality test can be performed on the state (404). Next, the state can be checked to see if it is less than the expected minimum or larger than the expected maximum (406). If the inequality test fails, then the least squares estimation can be performed again using a pseudo measurement constraint (408). However, measurements identified as potential faults in the first least squares implementation are included in the second implementation because different measurements may be identified as faults based on the use of the inequality constraint pseudo-measurement.

If the maximum value is exceeded, a pseudo-measurement at the minimum value can be used (410). The measurement uncertainty for this pseudo-measurement can be Oven by $$\sigma_\beta^2 = P_{k_{\beta_\alpha}}^+ \frac{\beta_{max} - \beta_{min}}{\hat{\beta} - \beta_{max}}, \quad [12]$$

where $\hat{\beta}$ is the value of the state after the least squares estimation (which now exceeds the maximum value), $\beta_{min}$ is the minimum value and also the value of the pseudo-measurement, $P_{k_{\beta_\alpha}}^+$ is the element of the state covariance matrix corresponding to the state which has exceeded the maximum, and $\beta_{max}$ is the maximum value.

If the minimum value is exceeded, a pseudo-measurement at the maximum value is used (412). The measurement uncertainty for this pseudo-measurement is given by $$\sigma_\beta^2 = P_{k_{\beta_\alpha}}^+ \frac{\beta_{max} - \beta_{min}}{\beta_{min} - \hat{\beta}}, \quad [13]$$

where $\hat{\beta}$ is the value of the bias after an update step (which now exceeds the minimum bias value) and $\beta_{max}$ is the value of the pseudo-measurement.

Next, least squares estimation is performed again with a revised measurement set, fault detection steps and a pseudo measurement constraint (414). If a new combination of measurements results from the use of the pseudo-measurement constraint, to avoid over-constraining the solution least squares estimation can be run again with this revised measurement set, with fault detection steps and without the pseudo-measurement constraint (416). Process 400 can then continue to step 402.

The impact of the pseudo-measurement on the estimation when there is no change in the measurements used is that the state is moved to the expected maximum or minimum point. If different measurements are detected as measurements faults, then the state can be different from the boundary value.

In many cases, the solution will be improved a great deal by the rejection of an outlier measurement, which improves the accuracy of the solution. However, it should be noted that the solution, with the revised set of included measurements, are potentially over-constrained unless the final iterative step is taken.

Exemplary Hardware Architecture

Figure 5:
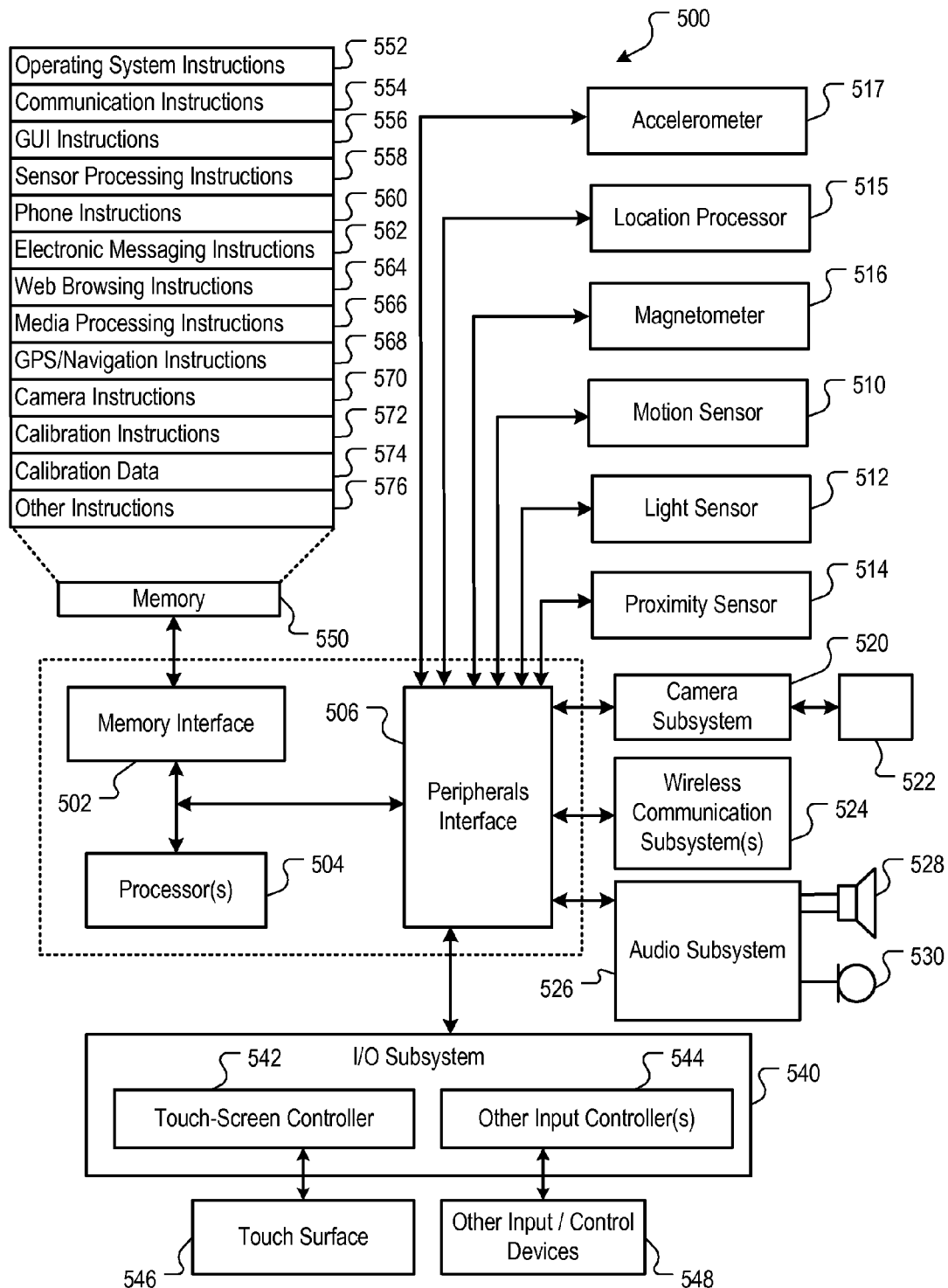
FIG. 5 is a block diagram of exemplary hardware architecture for a device implementing the features and processes described in reference to FIGS. 1-4.

FIG. 5 is a block diagram of exemplary hardware architecture for a device implementing the features and processes described in reference to FIGS. 1-4. The device can include memory interface 502, one or more data processors, image processors and/or processors 504, and peripherals interface 506. Memory interface 502, processor(s) 504 and/or peripherals interface 506 can be separate components or can be integrated in one or more integrated circuits. The various components in the device, for example, can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the mobile device. Location processor 515 (e.g., GPS receiver) can be connected to peripherals interface 506 to provide geo-positioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass. Accelerometer 517 can also be connected to peripherals interface 506 to provide data that can be used to determine change of speed and direction of movement of the mobile device.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which a mobile device is intended to operate. For example, a mobile device can include communication subsystems 524 designed to operate over a GSM network, a GPRS network, an EDGE network, a WiFi or WiMax network, and a Bluetooth network. In particular, the wireless communication subsystems 524 can include hosting protocols such that the mobile device can be configured as a base station for other wireless devices.

Audio subsystem 526 can be coupled to a speaker 528 and a microphone 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to a touch screen or surface 546. Touch screen or surface 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a mouse or stylus. The one or more buttons (not shown) can include an up/down button for volume control of speaker 528 and/or microphone 530. In one implementation, the user may be able to customize a functionality of one or more of the buttons. For example, the touch screen 546 can also be used to implement virtual or soft buttons and/or a virtual keyboard.

In some implementations, the device can present recorded audio and/or video files, such as MP3, AAC, and MPEG files. In some implementations, the device can include the functionality of an MP3 player. The device may include a pin connector that is compatible with accessories.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions, such as SMS and MMS; web browsing instructions 564 to facilitate web browsing-related processes and functions; media processing instructions 566 to facilitate media processing-related processes and functions; GPS/Navigation instructions 568 to facilitate GPS and navigation-related processes and instructions, such as the processes described in reference to FIGS. 1-4; and camera instructions 570 to facilitate camera-related processes and functions. The memory 550 may also store other software instructions (not shown), such as security instructions, web video instructions to facilitate web video-related processes and functions, and/or web-shopping instructions to facilitate web shopping-related processes and functions.

Memory 550 can include instructions for magnetometer calibration 572 and associated calibration data 574, as well as other instructions 576 for implementing various applications for using navigation solutions, such as mapping applications and location based service applications.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. Some elements of a computer are a processor for executing instructions and one or more memories for storing instructions and data. A computer can include, or be operatively coupled to communicate with a mass storage device for storing data files such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. Yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining, by a mobile device, maximum and minimum values of a motion speed of the mobile device based on speed limits in an uncertainty region, the uncertainty region being a region surrounding a position estimate of the mobile device and having dimensions that correspond to variances of a navigation system of the mobile device, wherein obtaining the maximum and minimum values comprises:
performing a look up using the uncertainty region in map data that specifies a speed limit in a geographic region corresponding to the uncertainty region;
estimating an excessive speed, the excessive speed being a speed amount by which people travel above the speed limit; and
determining the maximum value of a motion speed using the speed limit and estimated excessive speed;
estimating a mobile device state using an inequality constraint, the state including at least one of a position or a velocity of the mobile device, where the estimating includes:
determining if the maximum or minimum value of the inequality constraint was exceeded according to the navigation system of the mobile device;
responsive to the maximum value being exceeded, using a pseudo-measurement at the minimum value to update the estimated mobile device state; and
responsive to the minimum value being exceeded, using the pseudo-measurement at the maximum value to update the mobile device state; and
providing the estimated mobile device state as navigation solutions to a user interface for presentation to a user,
where the method is performed by one or more processors.

2. The method of claim 1, where estimating the mobile device state, further comprises:
estimating a position state of the mobile device using an altitude inequality constraint based on an altitude limit as a pseudo-measurement update to a state estimator.

3. The method of claim 2, where the inequality constraint is based on a digital elevation model.

4. The method of claim 1, where the estimating is performed by an Extended Kalman Filter (EKF).

5. The method of claim 4, where estimating a mobile device state using the EKF and inequality constraint, further comprises:

storing a state vector and covariance matrix after an EKF prediction step;
performing EKF measurement update steps with measurement fault detection and isolation techniques;
determining that update steps are applied sequentially;
applying an inequality test after each update step or after the measurement update steps;
determining that the inequality test passed; and
determining an estimated state of the mobile device.

6. The method of claim 4, further comprising:
storing a state vector and covariance matrix after an EKF prediction step;
performing EKF measurement update steps with measurement fault detection and isolation techniques;
determining that the update steps are applied sequentially;
applying an inequality test after each update step or after the measurement update steps;
determining that the inequality test did not pass;
storing the state vector and state variance covariance matrix, post-update, for use in computing the inequality constraint;
reverting the EKF to the stored state vector and state variance covariance matrix after each EKF prediction step;
applying the inequality constraint as a pseudo-measurement update with measurement variance; and
performing the EKF measurement steps with measurement fault detection and isolation techniques following the pseudo-measurement update.

7. The method of claim 6, further comprising:
determining a new combination of measurements; and
performing EKF update steps again from the stored EKF state with a revised set of measurements without fault detection and isolation techniques.

8. The method of claim 1, where the estimating is performed by a least-squares estimator.

9. The method of claim 8, where estimating a mobile device state using the least-squares estimator and inequality constraint, further comprises:
performing least-squares estimation with measurement fault detection and isolation;
performing an inequality test on a convergent state;
performing an inequality test to determine if the convergent state is less than an expected minimum constraint value or larger than an expected maximum constraint value;
determining that the inequality test passes; and
determining an estimated state of the mobile device.

10. The method of claim 9, further comprising:
determining that the inequality test fails;
performing least-squares estimation using a pseudo-measurement constraint;
determining that there is a new combination of measurements; and
performing least-squares estimation with a revised measurement set and without the pseudo measurement constraint.

11. A system comprising:
one or more processors;
memory coupled to the one or more processors and configured to store instructions, which, when executed by the one or more processors, causes the one or more processors to perform operations comprising:
obtaining maximum and minimum altitudes of a mobile device in an uncertainty region, the uncertainty region being a region surrounding a position estimate of the mobile device and having dimensions that correspond to variances of a navigation system of the mobile device, wherein obtaining the maximum and minimum altitudes comprises performing a look up using the uncertainty region in map data that specifies maximum altitude within the uncertainty region and a minimum altitude within the uncertainty region, and wherein an estimated altitude determined by the navigation system of the mobile device is inconsistent with the obtained altitudes, the inconsistency including the estimated altitude being higher than the maximum altitude or the estimated altitude being lower than the minimum altitude;

estimating a mobile device state using an inequality constraint, the state including at least one of a position or a velocity of the mobile device, where the estimating includes:

responsive to the estimated altitude being higher than the maximum value, using a pseudo-measurement at the minimum altitude to update the estimated mobile device state; and responsive to the estimated altitude being lower than the minimum value, using the pseudo-measurement at the maximum altitude to update the mobile device state; and providing the estimated mobile device state as navigation solutions to an application executing on the mobile device.

12. The system of claim 11, where estimating the mobile device state further comprises:

estimating a position state of the mobile device using an altitude inequality constraint based on an altitude limit as a pseudo-measurement update to a state estimator.

13. The system of claim 11, comprising determining if the estimated altitude determined by the navigation system of the mobile device is inconsistent with the obtained altitudes, wherein determining the inconsistency comprises:

determining a navigation state vector that includes position components and speed components;

determining a product of the navigation vector and a measurement function, the measurement function including a vector having a respective value corresponding to each position component and a respective value corresponding to each rate component, wherein measurement function emphasizes on a vertical component of the navigation state; and determining the maximum or minimum altitude of the inequality constraint was exceeded upon determining that the product is less than the minimum altitude or higher than the maximum altitude.

14. The system of claim 11, where the estimating is performed by an Extended Kalman Filter (EKF).

15. The system of claim 14, where estimating a mobile device state using the EKF and inequality constraint, further comprises:

storing a state vector and covariance matrix after an EKF prediction step;

performing EKF measurement update steps with measurement fault detection and isolation techniques;

determining that update steps are applied sequentially;

applying an inequality test after each update step or after the measurement update steps;

determining that the inequality test passed; and determining an estimated state of the mobile device.

16. The system of claim 15, where the operations further comprise:

storing a state vector and covariance matrix after an EKF prediction step;

performing EKF measurement update steps with measurement fault detection and isolation techniques;

determining that update steps are applied sequentially;

applying an inequality test after each update step or after the measurement update steps;

determining that the inequality test did not pass;

storing the state vector and state variance covariance matrix, post-update, for use in computing the inequality constraint;

reverting the EKF to the stored state vector and state variance covariance matrix after each EKF prediction step;

applying the inequality constraint as a pseudo-measurement update with measurement variance; and performing the EKF measurement steps with measurement fault detection and isolation techniques following the pseudo-measurement update.

17. The system of claim 16, where the operations further comprise:

determining a new combination of measurements; and performing EKF update steps again from the stored EKF state after the prediction step with a revised set of measurements without fault detection and isolation techniques.

18. The system of claim 11, where the estimating is performed by a least-squares estimator.

19. The system of claim 18, where estimating a mobile device state using the least-squares estimator and inequality constraint, further comprises:

performing least-squares estimation with measurement fault detection and isolation;

performing an inequality test on a convergent state;

performing the inequality test to determine if the convergent state is less than an expected minimum constraint value or larger than an expected maximum constraint value;

determining that the inequality test passes; and determining an estimated state of the mobile device.

20. The system of claim 19, where the operations further comprise:

determining that the inequality test fails;

performing least-squares estimation using a pseudo-measurement constraint;

determining that there is a new combination of measurements; and performing least-squares estimation with a revised measurement set without the pseudo measurement constraint.

21. A mobile device comprising:

one or more processors; and a non-transitory storage device storing instructions operable to cause the one or more processors to perform operations comprising:

obtaining, by the mobile device, maximum and minimum values of a motion speed of the mobile device based on speed limits in an uncertainty region, the uncertainty region being a region surrounding a position estimate of the mobile device and having dimensions that correspond to variances of a navigation system of the mobile device, wherein obtaining the maximum and minimum values comprises:

performing a look up using the uncertainty region in map data that specifies a speed limit in a geographic region corresponding to the uncertainty region;

estimating an excessive speed, the excessive speed being a speed amount by which people travel above the speed limit; and determining the maximum value of a motion speed using the speed limit and estimated excessive speed;

estimating a mobile device state using an inequality constraint, the state including at least one of a position or a velocity of the mobile device, where the estimating includes:
  determining if the maximum or minimum value of the inequality constraint was exceeded according to the navigation system of the mobile device;
  responsive to the maximum value being exceeded, using a pseudo-measurement at the minimum value to update the estimated mobile device state; and
  responsive to the minimum value being exceeded, using the pseudo-measurement at the maximum value to update the mobile device state; and
providing the estimated mobile device state as navigation solutions to a user interface for presentation to a user,
where the method is performed by one or more processors.

22. The system of claim 21, where estimating the mobile device state, further comprises:
  estimating a position state of the mobile device using an altitude inequality constraint based on an altitude limit as a pseudo-measurement update to a state estimator.

23. The system of claim 22, where the inequality constraint is based on a digital elevation model.

24. The system of claim 21, where the estimating is performed by an Extended Kalman Filter (EKF).

25. The system of claim 24, where estimating a mobile device state using the EKF and inequality constraint, further comprises:
  storing a state vector and covariance matrix after an EKF prediction step;
  performing EKF measurement update steps with measurement fault detection and isolation techniques;
  determining that update steps are applied sequentially;
  applying an inequality test after each update step or after the measurement update steps;
  determining that the inequality test passed; and
  determining an estimated state of the mobile device.

26. The system of claim 24, further comprising:
  storing a state vector and covariance matrix after an EKF prediction step;
  performing EKF measurement update steps with measurement fault detection and isolation techniques;
  determining that the update steps are applied sequentially;
  applying an inequality test after each update step or after the measurement update steps;
  determining that the inequality test did not pass;
  storing the state vector and state variance covariance matrix, post-update, for use in computing the inequality constraint;
  reverting the EKF to the stored state vector and state variance covariance matrix after each EKF prediction step;
  applying the inequality constraint as a pseudo-measurement update with measurement variance; and
  performing the EKF measurement steps with measurement fault detection and isolation techniques following the pseudo-measurement update.

27. The system of claim 26, further comprising:
  determining a new combination of measurements; and
  performing EKF update steps again from the stored EKF state with a revised set of measurements without fault detection and isolation techniques.

28. The system of claim 21, where the estimating is performed by a least-squares estimator.

29. The system of claim 28, where estimating a mobile device state using the least-squares estimator and inequality constraint, further comprises:
  performing least-squares estimation with measurement fault detection and isolation;
  performing an inequality test on a convergent state;
  performing an inequality test to determine if the convergent state is less than an expected minimum constraint value or larger than an expected maximum constraint value;
  determining that the inequality test passes; and
  determining an estimated state of the mobile device.

30. The system of claim 29, the operations further comprising:
  determining that the inequality test fails;
  performing least-squares estimation using a pseudo-measurement constraint;
  determining that there is a new combination of measurements; and
  performing least-squares estimation with a revised measurement set and without the pseudo measurement constraint.

31. A non-transitory storage device storing instructions operable to cause one or more processors to perform operations comprising:
  obtaining, by a mobile device, maximum and minimum values of a motion speed of the mobile device based on speed limits in an uncertainty region, the uncertainty region being a region surrounding a position estimate of the mobile device and having dimensions that correspond to variances of a navigation system of the mobile device, wherein obtaining the maximum and minimum values comprises:
    performing a look up using the uncertainty region in map data that specifies a speed limit in a geographic region corresponding to the uncertainty region;
    estimating an excessive speed, the excessive speed being a speed amount by which people travel above the speed limit; and
    determining the maximum value of a motion speed using the speed limit and estimated excessive speed;
  estimating a mobile device state using an inequality constraint, the state including at least one of a position or a velocity of the mobile device, where the estimating includes:
    determining if the maximum or minimum value of the inequality constraint was exceeded according to the navigation system of the mobile device;
    responsive to the maximum value being exceeded, using a pseudo-measurement at the minimum value to update the estimated mobile device state; and
    responsive to the minimum value being exceeded, using the pseudo-measurement at the maximum value to update the mobile device state; and
  providing the estimated mobile device state as navigation solutions to a user interface for presentation to a user,
  where the method is performed by one or more processors.

32. The non-transitory storage device of claim 31, where estimating the mobile device state, further comprises:
  estimating a position state of the mobile device using an altitude inequality constraint based on an altitude limit as a pseudo-measurement update to a state estimator.

33. The non-transitory storage device of claim 32, where the inequality constraint is based on a digital elevation model.

34. The non-transitory storage device of claim 31, where the estimating is performed by an Extended Kalman Filter (EKF).

35. The non-transitory storage device of claim 34, where estimating a mobile device state using the EKF and inequality constraint, further comprises:

storing a state vector and covariance matrix after an EKF prediction step;
performing EKF measurement update steps with measurement fault detection and isolation techniques;
determining that update steps are applied sequentially;
applying an inequality test after each update step or after the measurement update steps;
determining that the inequality test passed; and
determining an estimated state of the mobile device.

36. The non-transitory storage device of claim 34, the operations further comprising:
storing a state vector and covariance matrix after an EKF prediction step;
performing EKF measurement update steps with measurement fault detection and isolation techniques;
determining that the update steps are applied sequentially;
applying an inequality test after each update step or after the measurement update steps;
determining that the inequality test did not pass;
storing the state vector and state variance covariance matrix, post-update, for use in computing the inequality constraint;
reverting the EKF to the stored state vector and state variance covariance matrix after each EKF prediction step;
applying the inequality constraint as a pseudo-measurement update with measurement variance; and
performing the EKF measurement steps with measurement fault detection and isolation techniques following the pseudo-measurement update.

37. The non-transitory storage device of claim 36, further comprising:
determining a new combination of measurements; and
performing EKF update steps again from the stored EKF state with a revised set of measurements without fault detection and isolation techniques.

38. The non-transitory storage device of claim 31, where the estimating is performed by a least-squares estimator.

39. The non-transitory storage device of claim 38, where estimating a mobile device state using the least-squares estimator and inequality constraint, further comprises:
performing least-squares estimation with measurement fault detection and isolation;
performing an inequality test on a convergent state;
performing an inequality test to determine if the convergent state is less than an expected minimum constraint value or larger than an expected maximum constraint value;
determining that the inequality test passes; and
determining an estimated state of the mobile device.

40. The non-transitory storage device of claim 39, the operations further comprising:
determining that the inequality test fails;
performing least-squares estimation using a pseudo-measurement constraint;
determining that there is a new combination of measurements; and
performing least-squares estimation with a revised measurement set and without the pseudo measurement constraint.

* * * * *